L. H. WELLENSIEK.
DRIVE WHEEL FOR TRACTION ENGINES.
APPLICATION FILED MAY 11, 1914.
1,126,600.
Patented Jan. 26, 1915.
2 SHEETS—SHEET 1.
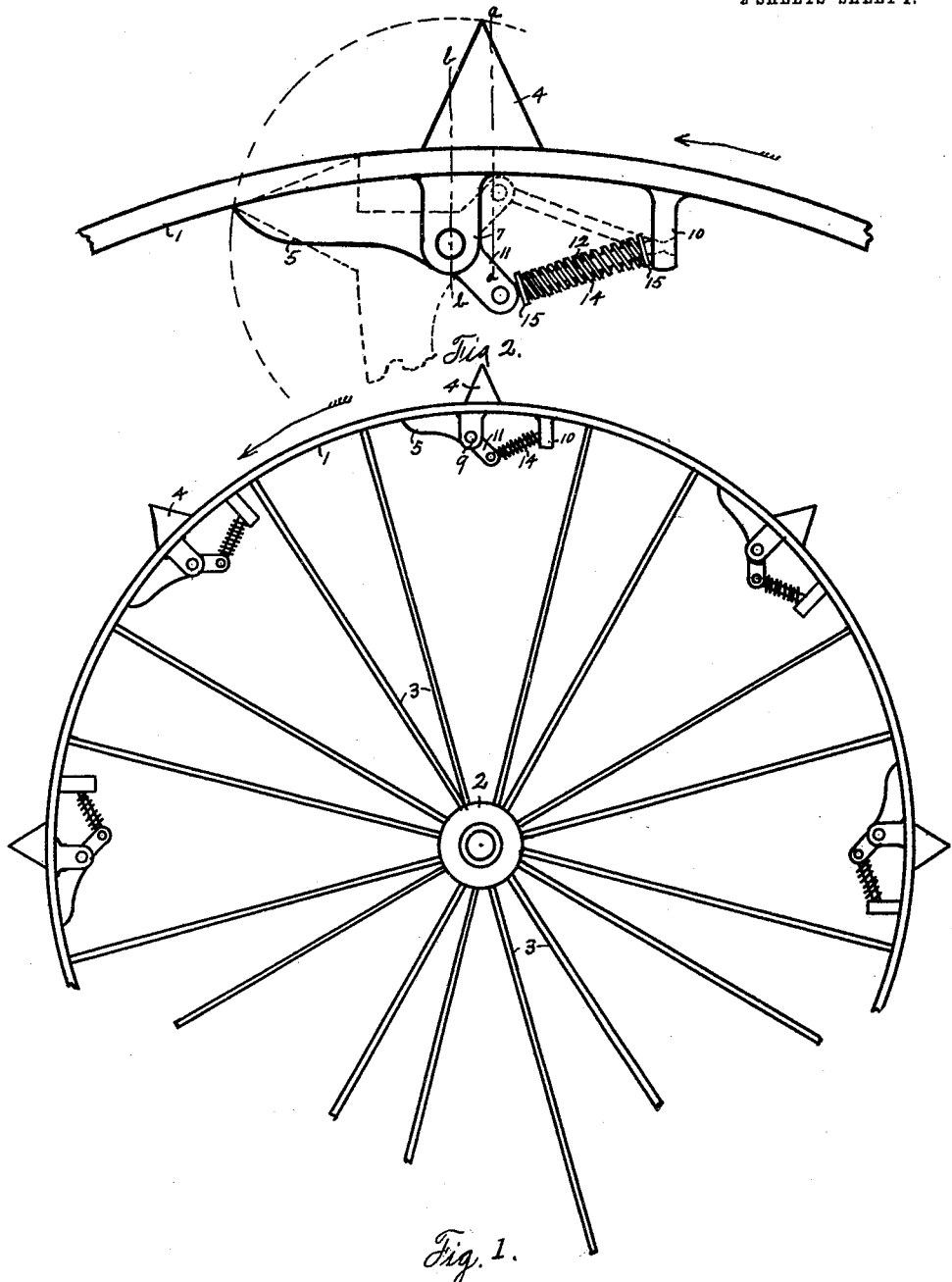

L. H. WELLENSIEK.
DRIVE WHEEL FOR TRACTION ENGINES.
APPLICATION FILED MAY 11, 1914.

1,126,600.

Patented Jan. 26, 1915.

2 SHEETS—SHEET 2.

WITNESSES:
O Baylor Hull
May Montgomery

INVENTOR
Louis H. Wellensiek
BY
Hardway & Cathey
ATTORNEYS.

THE NORRIS PETERS CO., PHOTO-LITHO., WASHINGTON, D. C.

UNITED STATES PATENT OFFICE.

LOUIS H. WELLENSIEK, OF HOUSTON, TEXAS, ASSIGNOR OF ONE-HALF TO S. W. TURNER, OF HOUSTON, TEXAS.

DRIVE-WHEEL FOR TRACTION-ENGINES.

1,126,600. Specification of Letters Patent. Patented Jan. 26, 1915.

Application filed May 11, 1914. Serial No. 837,750.

*To all whom it may concern:*

Be it known that I, LOUIS H. WELLENSIEK, a citizen of the United States, residing at Houston, in the county of Harris and State of Texas, have invented certain new and useful Improvements in Drive-Wheels for Traction-Engines, of which the following is a specification.

This invention relates to new and useful improvements in drive wheels for traction engines.

The object of the invention is to provide a wheel of the character described having a lug hinged or pivoted to the rim thereof and which normally projects beyond the periphery of said rim, but which may be withdrawn within the rim. Wheels of the character herein described are designed to be used on traction engines, which travel over the ordinary dirt road and it is necessary that the rim of the wheel have projecting lugs which engage with the surface of the road and prevent slippage of the wheels. Ordinarily these lugs are integral with the wheel rim and when pavement, or a bridge having a floor formed of boards, is encountered, the wheel lugs injure and tear up said paving or floor. The lugs of the wheel hereindescribed are pivoted so that they may be withdrawn when not needed and the injury above pointed out will thus be avoided.

A further feature of the invention resides in the provision of means whereby the lugs may be securely held either in their extended or withdrawn position.

With the above and other objects in view, the invention has particular relation to certain novel features of construction, operation and arrangement of parts, an example of which is given in this specification and illustrated in the accompanying drawings, wherein—

Figure 6:
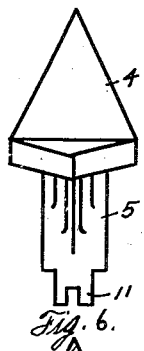
Figure 7:
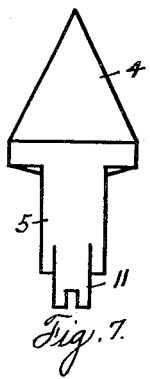
Figure 5:
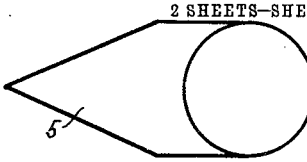
Figure 4:
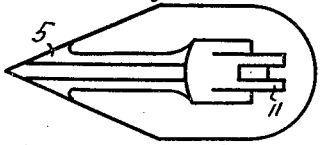
Figure 8:
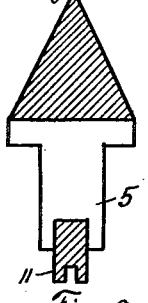
Figure 3:
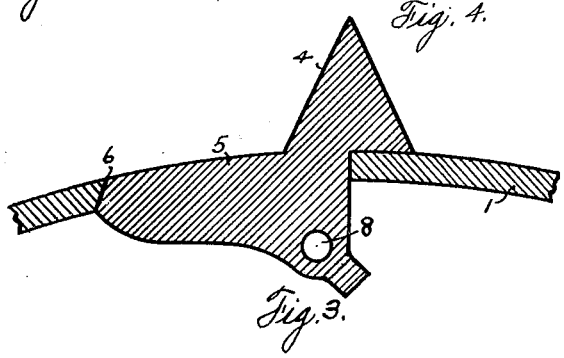
Figure 9:
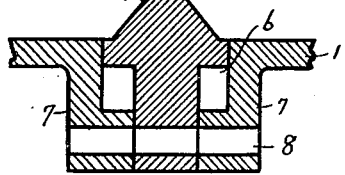
Figure 10:
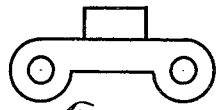
Figure 11:
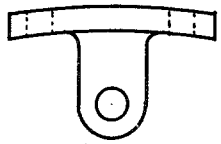
Figure 12:
Figure 13:
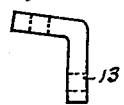

Figure 1 is a side view of a traction wheel, having the improved form of lug. Fig. 2 shows an assembled view of the lug and connecting parts. Fig. 3 shows a longitudinal vertical section of the lug. Fig. 4 shows a bottom view thereof. Fig. 5 is a top view thereof. Fig. 6 shows a front elevation of the lug. Fig. 7 shows a rear view thereof. Fig. 8 shows a transverse vertical sectional view, taken on the line *a—a* of Fig. 2. Fig. 9 shows a transverse vertical sectional view, taken on the line *b—b* of Fig. 2. Figs. 10 and 11 show side and top views, respectively, of a form of hinge employed for pivoting the lug, and Figs. 12 and 13 show top and side views, respectively, of a form of bracket employed for receiving one end of the spring supporting rod employed.

Referring now more particularly to the drawings, wherein like numerals of reference designate similar parts in each of the figures, the numeral 1 refers to the wheel rim supported from the hub 2 by means of the spokes 3. This rim is usually formed of steel or some other suitable metal and is of considerable width. The wheel shown in Fig. 1 is one of the rear or traction wheels, of the ordinary traction engine and receives rotation from the motor and propels the machine along. As the machine moves forward, the wheel rotates in the direction indicated by the arrows in Figs. 1 and 2. When traveling over soft or slippery surfaces, it is necessary that the rim 1 have projecting lugs to prevent slippage and for that purpose the lugs 4 have been provided. Each lug 4 has a lateral extension 5 which also projects inwardly beyond the base of the lug, said extension projecting through and fitting in a slot 6, cut through the rim 1. Projecting inwardly from the rim 1 is a double hinge member, whose parts are indicated by the numerals 7, 7, said member embracing the inwardly projecting extensions 5 and an alined orifice 8 extends through said hinge member and extension, which receives the pin 9, forming a pivot on which the lug operates. The hinge member 7 may be made integral with the rim, as shown in Fig. 2, or may be a separate member, as shown in Figs. 10 and 11, in which case it will be bolted to the inner side of the rim 1. Secured to the inner side of the rim, in the rear of each lug 4 is a bracket 10, which projects inwardly from the rim and the extension 5 has a rearwardly projecting hinge member 11, to which one end of the rod 12 is pivoted. The other end of this rod slides through an alined orifice 13, in the bracket 10. Surrounding the rod 12 is a strong coil spring 14, whose ends terminate in the collars 15, 15, which resist against the hinge member 11 and the bracket 10, respectively, but which are slidable on the rod 12. When the lug 4 projects from the rim 1, the resistance of the spring 14 against the hinge member 11 will operate to hold it in said projecting position. When occasion may arise, where the projecting lugs will not be desirable, the engine may be stopped and the lugs manually withdrawn, by forcing each lug 4 around into its corresponding slot 6, the extension 5 and the hinge member 11 then assuming the position shown in dotted lines in Fig. 2. During this operation, the spring 14 will yield so as to permit the withdrawal of the lug, the rod 12 sliding through the orifice 13. When the hinge member 11 has assumed the position shown in dotted lines in Fig. 2, the pressure of the spring 14 will operate to hold it in said position.

It is of course obvious that any desired number of lugs may be employed for each rim in accordance with the requirements of the situation and it is further obvious that the mechanical construction and operation of the lug may be varied, but I hereby reserve the right to make such mechanical changes therein as will not depart from the principle of the invention, as embodied in the appended claims.

What I claim is:—

1. A wheel of the character described having a rim, said rim being provided with slots, a lug projecting through each slot and pivoted to the rim so as to project through or to be withdrawn within the rim, a lateral extension carried by the lug and resting in said slot when the lug is in its projecting position, and a resilient member operating in resistance to the lug and holding the same in either of said positions.

2. A wheel of the character described having a rim, a plurality of lugs pivoted to the rim and arranged to project therefrom, said lugs being freely movable on their pivotal supports, so as to be readily withdrawn within the rim, a lateral extension carried by each lug and resting in the corresponding slot when its lug is in its projecting position, and a resilient member operated in resistance to the lug and holding the same in either of said positions.

3. A device of the character described including a rim having a slot therethrough, a lug projecting through said slot and being pivoted to the rim, a bracket fixed to the inner side of the rim in the rear of said lug, a rod pivoted to the inner end of the lug, at one end and whose other end has a slidable engagement with said bracket, and a resilient member surrounding said rod and interposed between said bracket and the inner end of said lug.

4. A device of the character described including a rim, a lug pivoted thereto and normally projecting beyond said rim, a bracket fixed to the inner side of said rim, in the rear of said lug, a rod pivoted to the inner end of said lug, at one end and whose other end has a slidable engagement with said bracket and a resilient member surrounding said rod and interposed between the said bracket and the inner end of said lug.

5. A device of the character described including a rim, having a slot therethrough, a lug projecting through said slot and being pivoted to the rim, a lateral extension carried by said lug and resting in said slot when the lug is in its projecting position, said lug having an inward extension and a resilient member, one end of which is fixed relative to the rim and the other end of which resists against the inward extension of said lug.

In testimony whereof I have signed my name to this specification in the presence of two subscribing witnesses.

LOUIS H. WELLENSIEK.

Witnesses:
C. A. MOFFITT,
R. A. TURNER.

Copies of this patent may be obtained for five cents each, by addressing the "Commissioner of Patents, Washington, D. C."